United States Patent
Riedl

(10) Patent No.: US 8,622,425 B2
(45) Date of Patent: Jan. 7, 2014

(54) HEIGHT-ADJUSTABLE SUPPORT FOR SEMITRAILERS

(75) Inventor: Reinhold Riedl, Miltenberg (DE)

(73) Assignee: SAF-Holland GmbH, Bessenbach (DE)

( * ) Notice: Subject to any disclaimer, the term of this patent is extended or adjusted under 35 U.S.C. 154(b) by 196 days.

(21) Appl. No.: 12/991,626

(22) PCT Filed: Feb. 10, 2010

(86) PCT No.: PCT/EP2010/051648
§ 371 (c)(1),
(2), (4) Date: Jan. 12, 2011

(87) PCT Pub. No.: WO2010/100017
PCT Pub. Date: Sep. 10, 2010

(65) Prior Publication Data
US 2011/0115205 A1    May 19, 2011

(30) Foreign Application Priority Data
Mar. 2, 2009    (DE) .................... 20 2009 002 932 U

(51) Int. Cl.
*B60S 9/02*    (2006.01)
(52) U.S. Cl.
USPC .................................... 280/763.1; 280/766.1
(58) Field of Classification Search
USPC ......... 280/763.1, 765.1, 766.1; 254/418, 419, 254/424, 425, 427
See application file for complete search history.

(56) References Cited

U.S. PATENT DOCUMENTS

| | | | | |
|---|---|---|---|---|
| 4,923,175 A * | 5/1990 | Bentrup | .................... | 254/419 |
| 5,238,266 A * | 8/1993 | VanDenberg | .............. | 280/766.1 |
| 6,684,726 B2 * | 2/2004 | Schmidt et al. | ................. | 74/342 |
| 6,926,305 B2 * | 8/2005 | Daniel | ........................ | 280/766.1 |
| 7,055,859 B2 * | 6/2006 | Peveler | ....................... | 280/766.1 |
| 7,083,196 B2 * | 8/2006 | Riedl | .......................... | 280/763.1 |
| 7,240,921 B2 * | 7/2007 | Baxter | ........................ | 280/763.1 |
| 7,258,363 B2 * | 8/2007 | Baxter | ........................ | 280/763.1 |
| 7,380,825 B2 * | 6/2008 | Peveler | ....................... | 280/766.1 |
| 7,398,959 B2 * | 7/2008 | VanDenberg et al. | ........ | 254/419 |
| 2001/0020781 A1 * | 9/2001 | VanDenberg et al. | ..... | 280/763.1 |

(Continued)

FOREIGN PATENT DOCUMENTS

| | | |
|---|---|---|
| DE | 202005018826 U1 | 4/2006 |
| EP | 0513973 A2 | 11/1992 |
| WO | 2008019973 A1 | 2/2008 |

*Primary Examiner* — Katy M Ebner
(74) *Attorney, Agent, or Firm* — Price Heneveld LLP

(57) ABSTRACT

A height adjustable support for semi-trailers includes a shaft tube body modable on a chassis of a semi-trailer, a slidable support inner tube arranged in the shaft tube and having a foot mounted to an end region thereof by a nut located on a spindle which is drivable by a transmission, wherein the transmission has a switchable spur gear region and beveled gear assemblies. The switching region of the transmission is formed from a lower-gear pinion and a fast-gear pinion each adapted to engage a crank drive, and a low-gear gearwheel and a fast-gear pinion each adapted to engage clutch coupling elements, wherein power is transmitted from the crank drive via the low-gear pinion to the low-gear gearwheel and alternatively from the crank drive via the fast-gear gearwheel to the fast-gear pinion. An output shaft and a tab drive unit are supported in a rotatable manner, wherein the tab drive unit comprises the fast-gear pinion and a fast-gear beveled pinion that are connected to one another in an unrotatable manner by a connecting member.

4 Claims, 2 Drawing Sheets

(56) References Cited

U.S. PATENT DOCUMENTS

| | | | |
|---|---|---|---|
| 2006/0061078 A1* | 3/2006 | Baxter | 280/763.1 |
| 2006/0119089 A1* | 6/2006 | Rivers et al. | 280/763.1 |
| 2008/0315570 A1* | 12/2008 | Baxter | 280/766.1 |
| 2009/0272952 A1* | 11/2009 | Manuel Alguera | 254/424 |

* cited by examiner

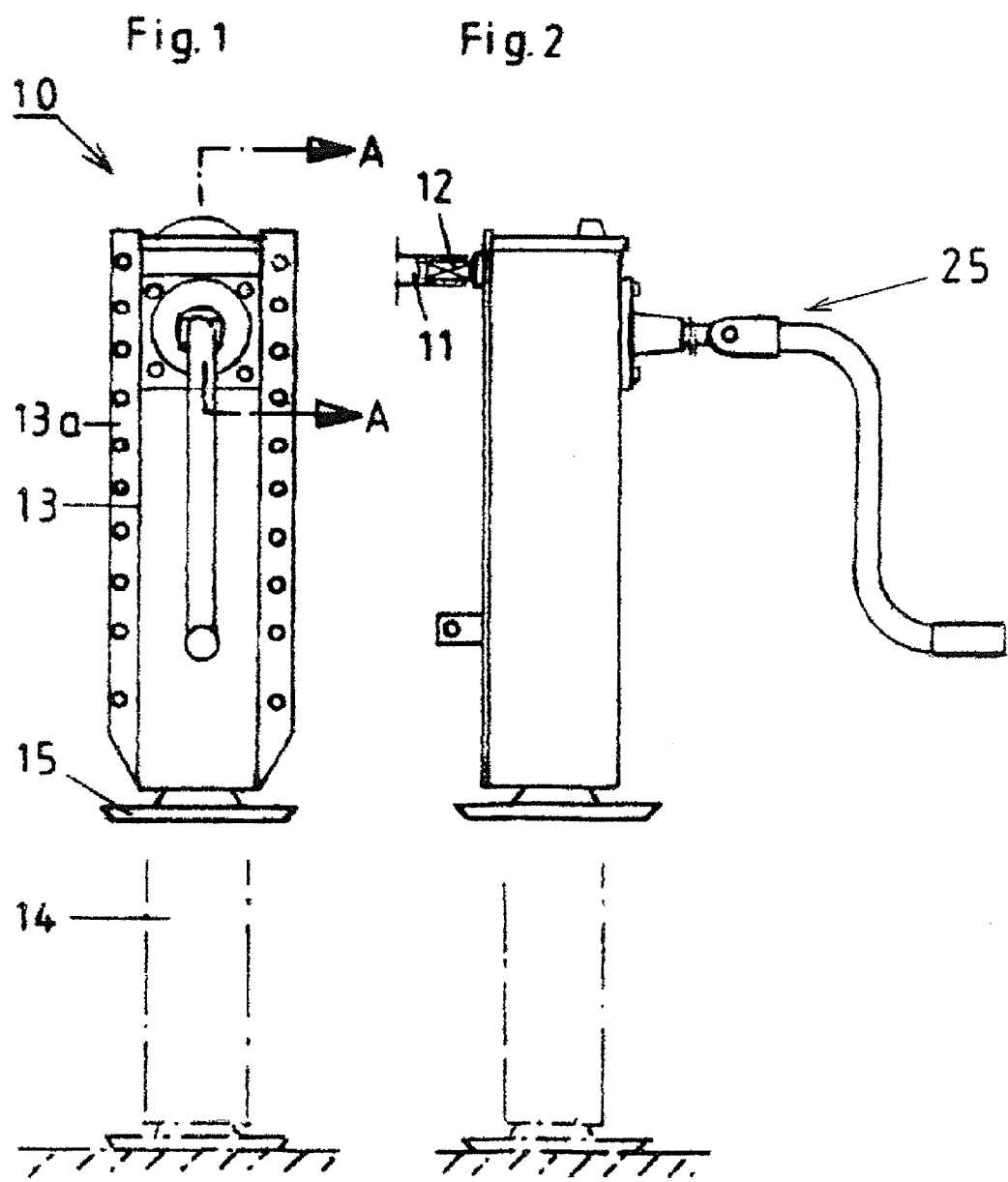

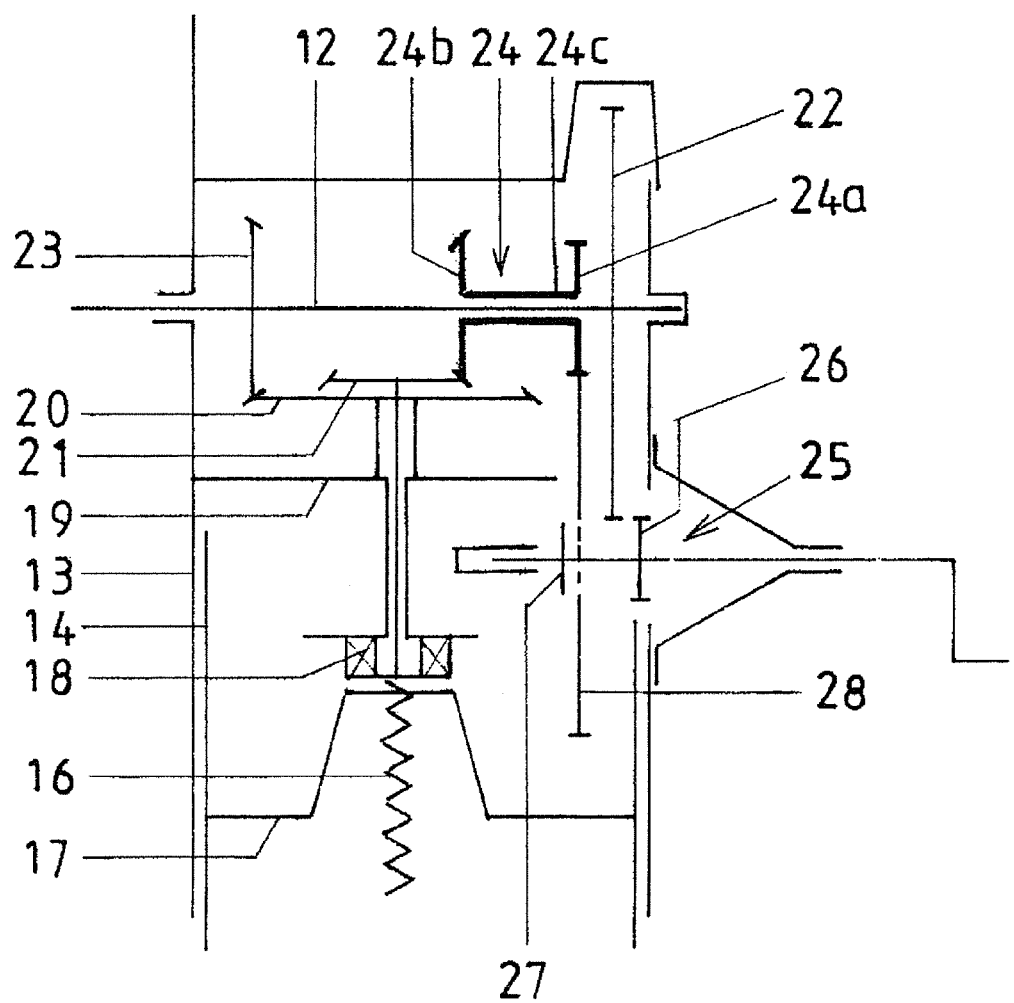

HEIGHT-ADJUSTABLE SUPPORT FOR SEMITRAILERS

BACKGROUND OF THE INVENTION

The present invention relates to a height-adjustable support for semi-trailers or the like.

Such supports are arranged in pairs in the front region of semi-trailers and in fast gear they can be brought into the support or transport position and, if necessary, for low-gear operation they can be used to lift a partial mass of the semi-trailer. In so doing, during the fast-gear operation, the fast-gear gearwheel coupled to the crank drive drives a pinion which is seated in an unrotatable manner on an overlying transmission output shaft. As in the low-gear operation, force is transmitted to a crown wheel via a bevel pinion which also is seated on the output shaft of the transmission in order to drive the spindle drive. From WO 2008/019973 a support for semi-trailers is known in which, for the transmission of power, after each gearwheel stage of the change-over transmission a separate transmission stage with bevel gear toothing is provided, which makes possible an increased fast gear. In this support, with respect to height, the crank drive is arranged above the transmission output journal. Therefore, for semi-trailers with a particularly low-lying frame, the mounting facilities are restricted in the case of such a support.

SUMMARY OF THE INVENTION

It is an object of the invention to provide a height-adjustable support for semi-trailers having a transmission with a crank drive which, with respect to height, is arranged below the output shaft and, nevertheless, has an increased fast gear.

According to the invention a height-adjustable support for semi-trailers or the like is provided, comprising a shaft tube body which is preferably stationarily mounted or mountable on the chassis of a semi-trailer, respectively, a slidable support inner tube arranged in the shaft tube body, at whose lower end region a foot is mounted and which is connected by means of a nut located on a spindle which is drivable by means of a transmission having a switchable spur gear region and bevel gear assemblies, wherein the transmission has a switchable spur gear region and bevel gear assemblies, wherein a switching region of the transmission is formed of a low-gear pinion and a fast-gear gearwheel which are attributed to a crank drive, as well as a low-gear gearwheel and a fast-gear pinion to which alternatively by means of clutch coupling elements power is transmitted from the crank drive via the low-gear pinion to the low-gear gearwheel or from the crank drive via the fast-gear gearwheel to the fast-gear pinion, and wherein on an output shaft a tab or slide drive unit is rotatably supported which tab drive unit comprises the fast-gear pinion and a fast-gear bevel pinion which are connected to one another in an unrotatable manner by means of a connecting member. In the support which is proposed, it is possible to arrange the crank drive in a known way lower than the output shaft of its transmission. Preferably, the fast-gear pinion can be seated on a tab drive unit which can also comprise an unrotatable bevel pinion for the fast gear or a fast-gear bevel pinion, respectively. Advantageously, the tab drive unit is supported in a rotatable manner on the output shaft.

Preferably, the tab drive unit is formed as a single piece.

Preferably, the tab drive unit and the output shaft have the same axis of rotation. An identity of axes of the tab drive unit and the output shaft is possible so that the tab drive unit and the output shaft have the same axis of rotation.

Expediently, the identity of axes of the output shaft and the tab drive unit makes it possible that the fast-gear bevel pinion engages with a bevel gear toothing of a smaller diameter.

Advantageously, the fast-gear bevel pinion engages with a small-diameter bevel gear toothing which is connected to the spindle in an unrotatable manner.

Expediently, the low-gear gearwheel is seated on the output shaft in an unrotatable manner.

In a preferred embodiment, a low-gear bevel pinion is seated on the output shaft in an unrotatable manner, which low-gear bevel pinion preferably engages with a large-diameter bevel gear toothing which is connected to the spindle in an unrotatable manner.

Advantageously, the tab drive unit is arranged between the low-gear gearwheel and the low-gear bevel pinion.

Preferably, the small-diameter bevel gear toothing is arranged concentrically to a large-diameter bevel gear toothing. The bevel gear toothing having the smaller diameter can be arranged concentrically to a bevel gear toothing having a larger diameter, which bevel gear toothing is used to drive the spindle drive in the low-gear stage. As far as the transmission and the transmission ratio are concerned, these are the prerequisites also for an increased fast-gear stage.

Expediently, the crank drive is connected to the low-gear pinion and to a carrier device for the fast-gear gearwheel which is arranged concentrically thereto.

Preferably, the crank drive points axially towards the spindle.

Further advantages and features of the invention result from the following description of preferred embodiments with respect to the drawings, wherein individual features of different embodiments can be combined to form new embodiments. The figures show:

BRIEF DESCRIPTION OF THE DRAWINGS

FIG. 1 a front elevational view of an embodiment of the support according to the invention;

FIG. 2 a side elevational view of the support shown in FIG. 1; and

FIG. 3 a schematic longitudinal section of an embodiment of the support according to the invention along line A-A of the support shown in FIG. 1.

DETAILED DESCRIPTION OF THE PREFERRED EMBODIMENTS

The support 10 shown in FIG. 1 and FIG. 2 is fixed in pairs to the chassis of a semi-trailer in its front region. The supports 10 of each pair are connected to one another by means of a connecting shaft 11 on their output shafts 12 and are retracted in their transport position, i.e. they are in their shortened state. Prior to uncoupling the semi-trailer from the road tractor, the supports 10 are extended. The support 10 has a support outer tube or a shaft tube body 13, respectively, and a support inner tube 14 arranged therein and slidable in the longitudinal direction. The inner section of the shaft tube body 13 and the support inner tube 14 preferably have square cross-sections. The support 10 is expediently fixed to the semi-trailer frame by means of flange legs 13a located on the shaft tube body 13. At the lower end of the support inner tube 14 a foot 15 is arranged or mounted, respectively, for placement onto the ground.

As is shown in FIG. 3, the support 10 has a spindle 16 with a nut 17. The nut 17 is connected to the support inner tube 14. On the shoulder of the spindle 16, there is seated an axial bearing 18 which is supported on a load-bearing floor 19 mounted inside the shaft tube body 13. Above the load-bearing floor 19, in concentric crown-wheel like arrangement and connected to the spindle 16 in an unrotatable manner, there are a large-diameter bevel gear or a large-diameter bevel gear toothing 20, respectively, and a small-diameter bevel gear or a small-diameter bevel gear toothing 21, respectively. Above the bevel gear toothings 20, 21 the output shaft 12 is arranged. On the output shaft 12, at the front, there is a low-gear gearwheel 22 and, at the rear, there is a low-gear bevel pinion 23, both mounted in an unrotatable manner. In between, on the output shaft 12, a tab drive unit 24 is supported in a rotatable manner. The tab drive unit 24 has a fast-gear pinion 24a and, spaced with respect to this pinion, a fast-gear bevel pinion 24b which, by means of a connecting member 24c, are connected to one another in an unrotatable manner. In the front region of the shaft tube body 13 and below the output shaft 12, there is an axially slidable crank drive 25. The crank drive 25 is in connection with a low-gear pinion 26 and a carrier device 27 for a fast-gear gearwheel 28 which is arranged concentrically thereto.

The transmission function of the support 10 is described as follows: In FIG. 3, the transmission is depicted in the freewheel state. In this state, the crank drive 25 is in the idle position.

In order to activate the fast-gear stage, the crank drive 25 is axially slightly drawn towards the outside. As a result, the carrier device 27 engages with the fast-gear gearwheel 28 and an axial fixing (not shown) of the crank drive 25 locks. When turning the crank drive 25, torque or force is transmitted from the fast-gear gearwheel 28 to the fast-gear pinion 24a of the tab drive unit 24 with a step-up transmission ratio and then continued from the fast-gear bevel pinion 24b to the small-diameter bevel gear toothing 21 so as to drive the spindle 16. Thus, the nut 17 as well as the support inner tube 14 are rapidly moved.

For the low-gear operation the crank drive 25 is inserted up to its axial locking, thereby causing the low-gear pinion 26 to engage with the low-gear gearwheel 22. When cranking the crank drive 25, force flows from the low-gear pinion 26 to the low-gear gearwheel 22 with a step-down transmission ratio. The output shaft 12 then transmits the increased torque to the low-gear bevel pinion 23. The low-gear bevel pinion 23 engages with the large-diameter bevel gear toothing 20 and, thus, drives the spindle 16, again with a step-down transmission ratio.

The invention claimed is:

1. A height-adjustable support for semi-trailers, comprising:
a shaft tube body mountable on a chassis of a semi-trailer, a slidable support inner tube arranged in the shaft tube body and having a foot mounted to an end region thereof by a nut located on a spindle which is drivable by a transmission, wherein the transmission has a switchable spur gear region and bevel gear assemblies,
wherein the switchable spur gear region of the transmission is formed from a low-gear pinion and a fast-gear gearwheel each adapted to engage a crank drive, and a low-gear gearwheel and a fast-gear pinion each adapted to selectively activate the low-gear pinion and the fast-gear gearwheel, respectively, wherein power is transmitted from the crank drive via the low-gear pinion to the low-gear gearwheel and alternatively from the crank drive via the fast-gear gearwheel to the fast-gear pinion; and
wherein on an output shaft, a tab drive unit is supported in a rotatable manner with respect to the output shaft, wherein the tab drive unit comprises the fast-gear pinion and a fast-gear bevel pinion that are connected to one another in an unrotatable manner by a connecting member, and wherein the low-gear gearwheel is seated on the output shaft in a rotatable manner.

2. A height-adjustable support for semi-trailers, comprising:
a shaft tube body mountable on a chassis of a semi-trailer, a slidable support inner tube arranged in the shaft tube body and having a foot mounted to an end region thereof by a nut located on a spindle which is drivable by a transmission, wherein the transmission has a switchable spur gear region and bevel gear assemblies,
wherein the switchable spur gear region of the transmission is formed from a low-gear pinion and a fast-gear gearwheel each adapted to engage a crank drive, and a low-gear gearwheel and a fast-gear pinion each adapted to selectively activate the low-gear pinion and the fast-gear gearwheel, respectively, wherein power is transmitted from the crank drive via the low-gear pinion to the low-gear gearwheel and alternatively from the crank drive via the fast-gear gearwheel to the fast-gear pinion; and
wherein on an output shaft, a tab drive unit is supported in a rotatable manner with respect to the output shaft, wherein the tab drive unit comprises the fast-gear pinion and a fast-gear bevel pinion that are connected to one another in an unrotatable manner by a connecting member and, wherein a low-gear bevel pinion is seated on the output shaft in an unrotatable manner, and wherein the low-gear bevel pinion engages with a second bevel gear that is connected to the spindle in an unrotatable manner.

3. The support according to claim 2, wherein the tab drive unit is arranged between the low-gear gearwheel and the low-gear bevel pinion.

4. A height-adjustable support for semi-trailers, comprising:
a shaft tube body mountable on a chassis of a semi-trailer, a slidable support inner tube arranged in the shaft tube body and having a foot mounted to an end region thereof by a nut located on a spindle which is drivable by a transmission, wherein the transmission has a switchable spur gear region and bevel gear assemblies,
wherein the switchable spur gear region of the transmission is formed from a low-gear pinion and a fast-gear gearwheel each adapted to engage a crank drive, and a low-gear gearwheel and a fast-gear pinion each adapted to selectively activate the low-gear pinion and the fast-gear gearwheel, respectively, wherein power is transmitted from the crank drive via the low-gear pinion to the low-gear gearwheel and alternatively from the crank drive via the fast-gear gearwheel to the fast-gear pinion; and
wherein on an output shaft, a tab drive unit is supported in a rotatable manner with respect to the output shaft, wherein the tab drive unit comprises the fast-gear pinion and a fast-gear bevel pinion that are connected to one another in an unrotatable manner by a connecting member, a fast-gear bevel pinion engages with a first bevel gear having a first diameter and which is connected to the spindle in a non-rotatable manner, a low-gear bevel pinion is seated on the output shaft in a non-rotatable manner and engages a second bevel gear that is connected to the spindle in a non-rotatable manner, and wherein the second bevel gear has a second diameter that is larger than the first diameter and is arranged concentrically to the first bevel gear.

* * * * *